Figure 4:
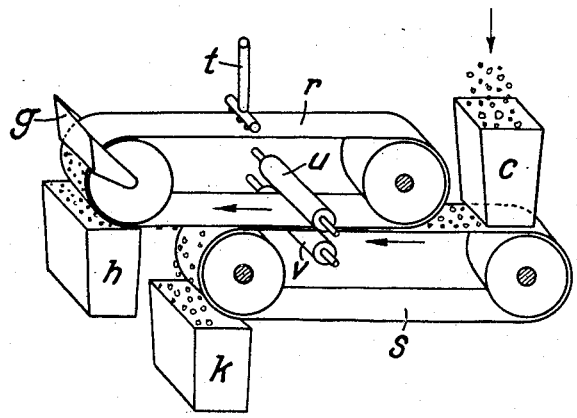

July 28, 1942. E. BIERBRAUER 2,291,447
APPARATUS FOR MECHANICALLY SEPARATING MINERAL MIXTURES
Original Filed Sept. 22, 1937 2 Sheets-Sheet 1
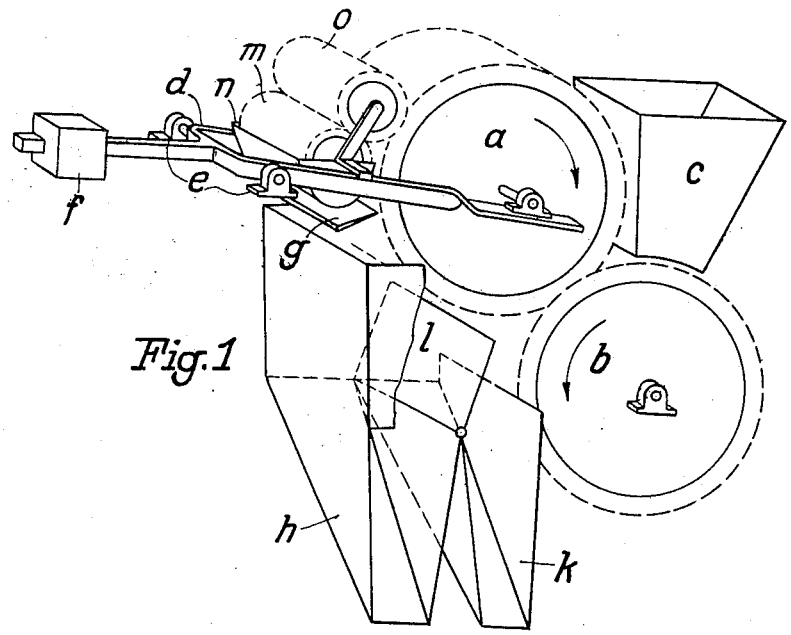
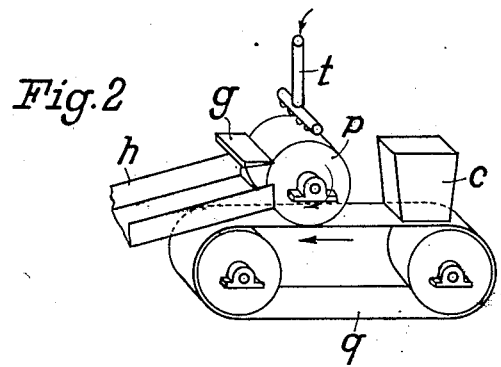
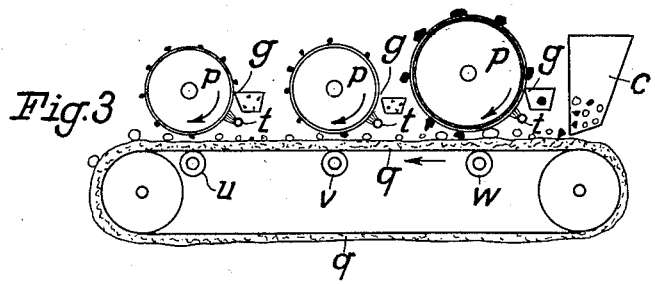
Inventor:
ERNST BIERBRAUER
BY Bailey & Carson
ATTORNEYS July 28, 1942.  E. BIERBRAUER  2,291,447
APPARATUS FOR MECHANICALLY SEPARATING MINERAL MIXTURES
Original Filed Sept. 22, 1937   2 Sheets-Sheet 2

*Inventor:*
ERNST BIERBRAUER
BY
ATTORNEYS

Patented July 28, 1942

2,291,447

UNITED STATES PATENT OFFICE 2,291,447

APPARATUS FOR MECHANICALLY SEPA-
RATING MINERAL MIXTURES

Ernst Bierbrauer, Leoben, Germany, assignor to
American Lurgi Corporation, New York, N. Y.,
a corporation of New York Original application September 22, 1937, Serial
No. 165,220. Divided and this application July
28, 1938, Serial No. 221,843

21 Claims. (Cl. 209—49)

This application is a division of my co-pending application Ser. No. 165,220 filed September 22, 1937 for "Method of mechanically separating mineral mixtures," now Patent No. 2,189,698, dated February 6, 1940.

This invention relates to a device for separating coarse-grained mixtures of substances and constitutes an improvement of the subject matter of my co-pending application Ser. No. 106,057 filed October 16, 1936, now Patent No. 2,189,124 dated February 6, 1940, which deals with a process for dressing coarse-grained mineral mixtures by making use of the different, and if necessary artificially differentiated, adhesiveness of the constituents of the mixtures with respect to more or less solid inorganic or organic adhesion masses.

According to this process, the constituents of a mixture are separated by superficially softening an adhesion mass and bringing it in this condition in contact with the mineral grains. During subsequent solidification the mass firmly unites with the substance capable of adhering thereto. Practical application of this separating method is usually effected by means of rotary drums or bands covered with an adhesion mass, on which the material to be separated is placed and which are passed through corresponding heating and cooling zones. Adhering grains stick during reversal of the support, and the non-adhering substance drops off either automatically or after subjection to a slight mechanical operation, such as tapping.

The employment of solidifying or hardening adhesion masses in the manner indicated affords the advantage that the adhesive forces available for the separation of the minerals are extraordinarily large and thus permit the separation of coarse-grained substances. Notwithstanding the great adhesive forces involved, the cohesion, or tendency to remain united, of the solid adhesion masses is still greater than the adhesion to the adhering component of a mixture, so that the adhering grains can be loosened without pollution and without loss of adhesion mass. This advantage which is particularly important in case organic adhesion masses are used involves, however, drawbacks that become apparent in the practical application of the process. Apart from the fact that the operating equipment is complicated by heating or cooling devices, the manner of setting also has an unfavorable effect. The relatively long period of setting, which in granular mixtures of 15 mm. to 30 mm. grain size amounts for instance to approximately 1 to 2 minutes, naturally results in a comparatively small output per unit of area of the mechanical members provided with adhesion mass or requires very large adhesive surfaces and consequently machines of large dimensions to attain big outputs.

The invention eliminates this difficulty and while retaining a mode of operation as free from pollution as possible insures considerable shortening of the adhesion process and thus of the throughput rate per unit of area of the adhesive mass.

Since the mechanical utilization of the accelerated adhering process by the use of corresponding high-speed machines unavoidably develops additional forces which counteract the adhesive forces, the invention further provides for attaining an increased adhesive effect to compensate these additional forces. It is only by the cooperation of these two factors that an optimum of the success aimed at by the invention can be attained.

According to the invention, the acceleration and intensification of the adhesion process are attained by bringing the grains to be separated into intimate contact with the adhesion mass under a certain application pressure instead of merely putting them on the mass, as was done hitherto. Adhesion will then occur the more quickly and intensively the larger the contacting interfaces between the grains and the adhesion mass are. By employing solid yet more or less plastic adhesion agents, such as, up to a certain degree, ice, or, more decidedly, organic substances like the various kinds of bitumen, pitches, waxes and resins, contact over a particularly large area can be obtained by the application pressure. The same, or even a still more increased, effect may be produced according to the invention by applying the adhesion masses to plastic or elastic supports consisting for instance of caoutchouc or cellular caoutchouc in which instance the adhesion masses need not absolutely be solid plastic substances. According to the invention, adhesion substances may be used also which consist of a plastic or elastic support provided with a filmy coat of a more or less liquid adhesive, though the coat shall be a mere trace on the support and united therewith by greatest possible adhesion, as then the same advantages and effects will be attained which result from the use of solid adhesion substances.

The application of the mineral grains to be separated to the correspondingly treated adhesion masses can be effected in different ways, namely, either by dynamically produced or static pressure, from which different possibilities ensue for practical operation. Static pressure, according to the invention, is transmitted by means of yielding or elastic intermediate substances, such as caoutchouc or cellular caoutchouc, etc., to the grains to be separated so as uniformly to cover all grains irrespective of differences as size and shape. The elastic intermediate means may for instance be used in such a manner that the grains to be separated lie on a rubber or spongy rubber plate and a plate provided with adhesion mass is pressed against the grains. Owing to the pliability of the elastic support, all grains will thus come into contact with the adhesion mass, and it depends entirely on the adhesive power of the individual grains whether or not they will unite with the adhesion mass. When the plate provided with adhesion mass is lifted, the adhesive grains will stick to it whilst the non-adhesive grains will remain on the rubber plate.

Owing to the pollution of the adhesion surface the more or less solid adhesion masses, particularly the organic substances, gradually lose their adhesive power, and the surface thereof must therefore be renewed from time to time. In the application of the process described in my older application, which provides for constantly alternating heating and cooling of the adhesion mass, the surface of the latter is automatically renewed due to continuous softening, so that special measures and devices for this purpose can be dispensed with. The new method, however, based on the application of surface pressure, often, and particularly when organic adhesion masses are employed, requires additional measures for constantly maintaining uniform and intensive adhesion and thereby the fundamental conditions for continuously carrying out the pressure process. Regeneration could be effected for instance by putting on new adhesion mass, possibly by applying a new layer of molten petroleum bitumen to the existing layer if petroleum bitumen serves as adhesion mass. The surface of the adhesion mass may further be renewed by periodic softening through heating so as to disclose its initial adhesiveness after resolidification. The same end can be attained by mechanical scraping of the used surface layer.

A still simpler expedient is superficially to dissolve or soften the adhesive substances by chemical action to renew or even to increase their adhesive power. When solid organic adhesive substances are employed, regeneration and simultaneous intensification of adhesive power are effected according to the invention by treating the surface with liquid or gaseous organic substances like petroleum and its various products of distillation, benzine, benzene, phenol, cresol, toluene, or with tar oils, paraffin oils, etc. The liquid organic regenerating agents may be used as such or as solutions containing the dissolved adhesive substance. It has further been found advantageous to employ the liquid regenerating agents in the form of aqueous emulsions, in which case only very slight amounts of the regenerating agents come into contact with the adhesion mass to be regenerated, so that the action is restricted to the surface.

In addition to organic regenerating agents inorganic purifiers may be used. It has been ascertained for example that particularly sulfuric acid as well as other inorganic acids and bases are suited for this purpose. The regenerating agent is either wiped off or dries or evaporates, so that within a reasonable time the desired firm consistency of the surface of the adhesion mass will be regained. This surface should be in such condition that in the dry state it feels sticky when a finger is passed over it, though the finger should not become soiled even at the exertion of greater pressure. This criterion is mentioned, because it demonstrates in a simple and clear manner the condition of the surface of the adhesion mass as required by the new method and, further, because it illustrates the essential difference of the new method as to the nature and consistency of the adhesion mass used compared with those older methods which employ liquid organic adhesion agents for the separation of fine-grained mineral mixtures, apart from the fact that these older methods lack also artificial differentiation of the adhesiveness of the mineral mixtures preferably applied according to the invention, and by their very nature are restricted to working fine-grained mineral mixtures.

When instead of organic adhesion masses ice or other solidifying inorganic substances are used, the chief regenerating agents will be water or aqueous solutions of the cementing or adhesive substances concerned.

The same effect as that produced by treating the adhesion mass with the organic regenerating agents or their aqueous emulsions mentioned can be attained according to the invention by wetting the grains to be separated with the regenerating liquids after pretreatment.

This step, which may also be carried out during pretreatment as stated below, increases moreover, the adhesion of the adhesive grains to the adhesion mass and thereby facilitates the practical application of the pending application Ser. No. 106,057. Substantially the same or similar, usually water soluble, organic reagents are employed for differentiating the adhesiveness of the constituents of a mineral mixture, which in flotation practice serve as collecting agents for differentiating the wetting capacity or floatability. The adhesive capacity imparted during this preliminary treatment to one kind of substances with respect to organic adhesion masses can be essentially intensified according to the invention by adding to the aqueous solutions of the collecting agents serving for artificially differentiating adhesiveness water insoluble organic liquids, such as the above mentioned regenerating agents. The amount of addition should be chosen so that the adsorbing substance of the mineral mixture after removal from the solution appears to be quite dry and poorly wettable by water. This will generally occur if the addition amounts approximately up to 2% of the treating liquid. Experiments show for instance that in case of alkaline-earth minerals rendered adhesive relative to organic adhesion masses by being treated with aqueous solutions of sebacates an addition of about 2% petroleum causes a noteworthy increase in the adhesion of the treated substances relative to an adhesion mass consisting of, say, petroleum bitumen. This intensification is so strong that even a much used adhesion surface to which mineral grains not treated by this addition will not stick any more discloses again great adhesiveness so that regeneration may be dispensed with. This manner of preliminary treatment is therefore highly important for the practical application of the pressure method and forms a valuable step therein.

The following test which can be carried out with simple means will illustrate the pressure method.

The equipment required merely comprises a sponge rubber plate and a sheet metal or wooden plate having about the same size. The latter is covered on one side with a layer of petroleum bitumen having a melting point of about 60° C. and being therefore solid at ordinary room temperature. The mineral mixture to be separated was a natural mixture of about 50% phosphatic material, phosphorite in lumps and 50% gangue, quartzy rubble with a grain size of about 15 to 30 mm. As these two kinds of minerals in their natural water-wetted condition show no adhesiveness relative to the adhesion mass mentioned, the mixture was first subjected to preliminary treatment for differentiation. For this purpose the mixture was thoroughly worked for about 3 minutes with an approximately 1% aqueous solution of sodium palmitate. During this treatment selective adsorption of the palmitate to the surface of the phosphorite grains will occur, so that owing to the orientation of the molecules connected with adsorption the grains are provided with an outer skin of hydrocarbons and thus with an adhesive cover being affinitive relative to organic adhesion masses. As at this treatment only the phosphorite lumps react in the manner indicated and the quartzy rubble superficially does not undergo any change the result will be a differentiation in adhesive power. When the pretreated mixture after rinsing with water is placed directly on the adhesion mass mentioned adhesion of the phosphorite lumps capable of adhering will occur only after a few minutes, which however, in spite of the long duration, is still relatively slight. If the experimental conditions are, however, chosen according to the invention, instant and firm adhesion will be effected. During the experiment the surface of the adhesion mass was first coated with a solution of petroleum bitumen in petroleum and the coat allowed to dry. The phosphorite-quartz mixture pretreated with palmitate and rinsed with water was then placed on a sponge rubber plate, whereupon the adhesion plate was applied to the grains at slight pressure. Directly after pressing the adhesion plate was lifted again, and it was found that almost all phosphorite grains firmly stuck to it whilst the majority of the quartz grains remained on the rubber support. In this way a concentrate of 98% phosphorite at a phosphorite yield of 94% could be attained.

It has been stated already that the size of the area of contact between the mineral grains and the adhesion mass is decisive with respect to adhesive intensity and that this interface can be increased according to the invention by the use of plastic adhesion masses or by applying adhesives to pliable bodies of plastic or elastic nature. The effect of this measure can also be proved by the small test described. For this purpose the adhesion mass was applied not to a rigid plate but to a sponge rubber sheet which was then secured to a corresponding rigid support. Otherwise, the mode of experimental procedure described was followed again. The test showed an increase in the phosphorite content of the concentrate to about 99% and a yield of 96% instead of 94%. Whilst the increase in yield is directly due to the improved adhesion effect brought about by the elastic adhesion plate, the higher degree of purity of the concentrate must also be ascribed to the use of an elastic support for the adhesion mass. A few quartz grains, particularly such having a particularly porous or jagged surface, stick to the adhesion mass together with the phosphorite grains during pressing for purely mechanical causes. By the expansion of the rubber support of the adhesion mass at the cessation of pressure these very loosely adhering quartz grains are pressed off again from the adhesion mass, and this process constitutes therefore an automatic after-purification of the concentrate and, according to the invention, is utilized in continuous operation to obtain concentrates of the greatest possible purity.

It was further proved by experiments that in the same manner and by using the same reagent in the preliminary treatment of mineral mixtures other alkaline earth minerals like calcspar, dolomite, magnesite, fluorspar, strontianite, celestite, heavy spar, etc. as well as heavy metal minerals of oxidic and sulfidic type, such as siderite, galena, etc., can be separated from quartz and other gangue minerals in granulation up to 100 mm. grain size and over. The tables below state the results of such tests made with mixtures of magnesite and serpentine and of siderite and quartz. All mixtures were natural products which for better separation had been previously classified by screening.

*Magnesite—Serpentine, granulation 10 to 30 mm.*

| Product | Percent by weight: | Magnesite content per cent: | Serpentine content per cent: | Magnesite yield per cent: |
|---|---|---|---|---|
| Concentrate | 27.00 | 95.00 | 5.00 | 95.00 |
| Tailings | 73.00 | 2.00 | 93.00 | 5.00 |
| Charge | 100.00 | 27.20 | 72.80 | 100.00 |

*Siderite—Quartz, granulation 20 to 35 mm.*

| Product | Per cent by weight: | Siderite content per cent: | Quartz content per cent: | Siderite yield per cent: |
|---|---|---|---|---|
| Concentrate | 63.00 | 96.70 | 3.30 | 97.00 |
| Tailings | 37.00 | 4.20 | 95.80 | 3.00 |
| Charge | 100.00 | 62.40 | 37.60 | 100.00 |

Experiments carried out with the same mineral mixtures, but employing for the preliminary treatment an aqueous palmitate solution to which about 2% petroleum as added led to still sharper separation and permitted, moreover, the use of adhesion masses that were quite used up.

Instead of petroleum bitumen and other solid hydrophobe organic adhesion masses inorganic adhesion masses, especially freezing water, were examined also. As to sharpness of separation, practically the same results were obtained. The process itself differs from the one applied in case of organic adhesion masses in so far as the hydrophile gangue sticks while substances like phosphorite, magnesite, siderite, etc., which have become hydrophobe during the preliminary treatment described do not show any adhesive power relative to ice or other solidifying hydrophile adhesion masses.

As already mentioned all the organic agents used in the flotation for differentiating the floatability are adapted to influence the adhesiveness. Therefore besides the salts of the fatty acids which are especially adapted for alkaline earth minerals such as natrium palmitate also the xanthates, further sulfonates of the alcohols, resin acids and resin soaps as well as aqueous emulsion of the oils may be used. The latter are especially advantageous if coals or rocks containing organic ingredients shall be separated from barren rocks, profiting by the differences of adhesiveness. In numerous cases as to coals, graphite and the like their natural adhesiveness to organic adhesion masses is so great that for the differentiation of the adhesiveness a treatment with water only is sufficient. So it was for example possible to separate according to the process described a mixture of coal and slates in a size of 30 to 60 mm. which was before only treated with water.

Concerning the workability of grain sizes it was found that the new method covers grain sizes ranging from approximately 1 mm. to 100 mm. grain diameter. In practical operation, in the interest of the quality of separation it will be advisable to subject to separate material which does not differ too much in grain size and which has been previously sorted by screening into classes each of which is then worked separately by applying to it the pressure best suited to it.

The method according to the invention can be continuously carried out by the use and suitable combination of simple apparatus and devices of substantially known type. In continuous operation these machines preferably bring the material to be separated under regulatable pressure and with the aid of elastic intermediate means into contact with the constantly or periodically to be regenerated adhesion mass and discharge the adhering grains separately from the non-adhering ones.

Figure 5:
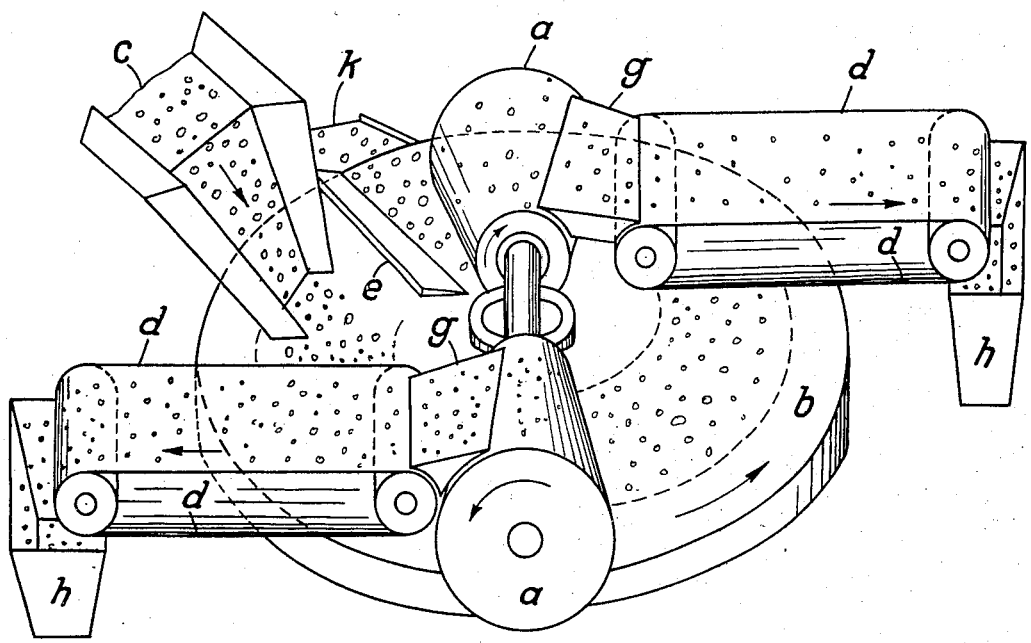

By way of example, equipment for carrying out the method according to the invention is illustrated in the accompanying drawings, in which Figure 1 is a view of a very simple device: Figs. 2 and 3 are views of similar constructions: Figs. 4 and 5 show modified devices.

The device shown in Fig. 1 substantially comprises two horizontal rotary drums or rollers $a$ and $b$ which move in opposite directions. The lower drum $b$ serves for supplying material coming from the hopper $c$, and the top roller $a$ carries the adhesion mass and applies pressure. The lower roller $b$ is provided with a jacket of spongy rubber or similar elastic material, and the top roller $a$ also has preferably a jacket of this type which serves as elastic support for the adhesion mass, for instance petroleum bitumen. To permit regulation of pressure the top roller $a$ can move about the pivot $e$ and the pressure can be adjusted by means of the compensation weight $f$ displaceable on the lever $d$. This lever arrangement affords the added advantage of a particularly elastic seating of the application roller $a$ and makes it possible to lift off the pressure roller $a$ from the feed roller $b$ when the machine stops. Regulatable pressure could of course also be attained by elastic means of other simple expedients, such as springs, rubber buffers, pressure cylinders, etc.

The grain mixture is separated in such manner that the adhering grains are, as it were, lifted out of the mixture by the top roller, whilst the non-adhering grains are discharged from the lower roller. A stripper $g$ removes adhering grains from the top or lifting roller $a$ and lets them drop into the discharge trough $h$, whereas the non-adhering grains are discharged into the trough $k$. Between the two discharge troughs $h$ and $k$ an adjustable plate $l$ serves for regulating discharge. The rollers $a$ and $b$ can be driven by providing a suitable drive (not shown) for the lower roller $b$ which then drives the upper one by friction. For constant or periodic regeneration of the adhesion mass a suitable device may be used, which comprises for instance a trough $n$, a feed roller $m$, and a moistening roller $o$. For the same purpose spraying nozzles could be used.

A machine of the type described provided with rollers of 50 cm. diameter and 15 cm. width making 20 revolutions per minute for handling phosphorite mixtures with a granulation of approximately 15 mm. to 30 mm. had a throughput per hour of more than two tons. For the formerly mentioned mineral mixtures in this way the same and partially even better results as to the separation were obtained, compared with the last given example.

Fig. 2 shows in diagram an arrangement, in which the lifting roller $p$ is retained, but the material to be separated is fed suitably through a hopper $c$ by means of the rotary band $q$, the band $q$ and possibly also the roller $p$ being covered with spongy rubber. The functions of these two elements are similar to those of the two rollers in Fig. 1; thus a stripper $g$ removes the adhering grains from the lifting roller $p$ and lets them drop into the discharge trough $h$. In order to regenerate the adhesion masses covered on the roller $p$ a suitable sprinkling device $t$ is provided above the roller $p$. The pressure of the roller $p$ against the belt $q$ may be regulated by a lever $d$ and a compensation weight $f$ displaceable on said lever $d$ as shown in Fig. 1. Compared with the construction shown in Figs. 1 and 2 the device shown in Fig. 3 is superior in so far as a plurality of lifting rollers $p$ may be arranged for picking one after another above a conveyor belt $q$ for instance to insure repetition. The adhering grains are lifted by strippers $g$ and the regenerating of the adhesion mass on the rollers $p$ is performed by sprinkling devices $t$. In order to insure sufficient contact between the conveyor belt $q$ which is coated with a rubber, rollers $u, v, w$, are arranged on the inside of said belt $q$.

The same advantage is obtained by the device shown in Fig. 4 owing to the replacement of the rollers by two superposed rotating endless bands $r$ and $s$ which otherwise are equipped like the rollers shown in Figs. 1 and 2. Where the two bands are in contact, they are pressed together by suitable means, e. g. by a pair or several pairs of rollers $u$ and $v$ and thus bring about the same effects as the corresponding members in the constructions shown in Figs. 1 and 2. As the material fed by the band $s$ (Fig. 4) is for a longer time in pressure contact with the adhesion mass on the band $r$, adhering grains will be fully lifted or picked out without any repetition. The adhering grains stick to the top band $r$, and are discharged by a stripper $g$ into a bunker $h$. The non-adhering grains are discharged by the lower band $s$ during the reversal thereof into a bunker $k$.

In Fig. 5 another modified construction is shown. Instead of a conveyor belt or a feed roller $a$ rotating table $b$ as shown in Fig. 5 may be used on which one or more picking rollers $a$ are disposed which should be conical like edge runners. The arrangements described with reference to Fig. 1 cover also constructions of this type with respect to drive, charge, discharge, regeneration of the adhesion mass, etc. Thus discharge of the adhering grains is performed by strippers $g$ and belt conveyors $d$ which convey the adhering grains to bunkers $h$. The non-adhering grains which remain on the table $b$ are swept from the table by stripper *e* into a trough *k*.

I claim:

1. An apparatus for the mechanical separation of wetted coarse-grained mineral mixtures by the difference of their constituents in adhesiveness relative to adhesion masses, comprising in combination a tacky adhesion mass of a material selected from the group consisting of hydrophilic and hydrophobic substances adapted to adhere selectively constituents of said mixtures having at least more than 3 mm. diameter in accordance with their wetness, a rotary surface coated with said adhesion mass, a second surface on which the said coarse-grained mixtures are placed, means to cause said rotary surface to roll on said second surface, and an elastic means of sponge rubber forming at least one of said surfaces to exert a pressure when contacting the said surface coated with the adhesion mass with said second surface covered with said mineral mixtures.

2. An apparatus for the mechanical separation of wetted coarse-grained mineral mixtures by the difference of their constituents in adhesiveness relative to adhesion masses, comprising in combination a tacky adhesion mass of an organic hydrophobic substance adapted to adhere selectively constituents of said mixtures having at least more than 3 mm. diameter in accordance with their wetness, a rotary surface coated with said adhesion mass, a second surface on which the said coarse-grained mixtures are placed, means to cause said rotary surface to roll on said second surface, and an elastic means of sponge rubber forming at least one of said surfaces to exert a pressure when contacting the said surface coated with the adhesion mass with said second surface covered with said mineral mixtures.

3. An apparatus for the mechanical separation of wetted coarse-grained mineral mixtures by the difference of their constituents in adhesiveness relative to adhesion masses, comprising in combination a tacky adhesion mass of petroleum bitumen adapted to adhere constituents of said mixtures having at least more than 3 mm. diameter, a rotary surface coated with said adhesion mass, a second surface on which the said coarse-grained mixtures are placed, means to cause said rotary surface to roll on said second surface, and an elastic means of sponge rubber forming at least one of said surfaces to exert a pressure when contacting the said surface coated with the adhesion mass with said second surface covered with said mineral mixtures.

4. An apparatus for the mechanical separation of wetted coarse-grained mineral mixtures by the difference of their constituents in adhesiveness relative to adhesion masses, comprising in combination a tacky adhesion mass adapted to adhere selectively constituents of said mixtures having at least more than 3 mm. diameter in accordance with their wetness, a rotary surface having a sponge rubber covering coated with said adhesion mass, a second surface having a sponge rubber covering on which said coarse-grained mixtures are placed, means to cause said rotary surface to roll on said second sponge rubber covering, and means to exert a pressure between such surfaces during said rolling.

5. An apparatus for the mechanical separation of wetted coarse-grained mineral mixtures by the difference of their constituents in adhesiveness relative to adhesion masses, comprising in combination a tacky adhesion mass of a material selected from the group consisting of hydrophilic and hydrophobic substances adapted to adhere selectively constituents of said mixtures having at least more than 3 mm. diameter in accordance with their wetness, a rotary surface having a sponge rubber covering coated with said adhesion mass, a second surface having a sponge rubber covering on which said coarse-grained mixtures are placed, means to cause said rotary surface to roll on said second sponge rubber covering, and means to exert a pressure between such surfaces during said rolling.

6. An apparatus as claimed in claim 1 in which said first rotary surface is a conical drum and said second surface is a rotary member.

7. An apparatus as claimed in claim 1 in which said first rotary surface is a conical drum and said second surface is a rotary member, sponge rubber forming said second surface.

8. An apparatus as claimed in claim 1 in which said first rotary surface is a conical drum and said second surface is a rotary member, sponge rubber forming said first surface.

9. An apparatus for the mechanical separation of wetted coarse-grained mineral mixtures by the difference of their constituents in adhesiveness relative to adhesion masses, comprising in combination a rotary drum having an adhesion mass coated thereon of a material selected from the group consisting of hydrophilic and hydrophobic substances and adapted to adhere selectively grains of said mixtures having at least more than 3 mm. diameter in accordance with their wetness, a second rotary drum adapted to feed the said mixtures to said first rotary drum and to exert pressure thereon, a sponge rubber coating at least on said second rotary drum, and means for separately discharging the said constituents of different adhesiveness to said adhesion mass.

10. An apparatus as claimed in claim 1, in which said surfaces are rolls.

11. In an apparatus as claimed in claim 1 means for regenerating the adhesion mass.

12. An apparatus as claimed in claim 1, in which said surfaces are rolls, means for stripping the adhering grains from said adhesion mass, a trough adapted to contain a liquid, a feed roller in said trough and a moistening roller in contact with said feed roller and said adhesion mass.

13. An apparatus for the mechanical separation of coarse-grained mineral mixtures by the difference of their constituents in adhesiveness relative to adhesion masses, comprising in combination an adhesion mass adapted to adhere constituents of said mixtures having at least more than 3 mm. diameter, a conical rotary drum having a sponge rubber layer thereon coated with said adhesion mass, a rotary table on which said rotary drum rolls, means to exert pressure during rolling of said drum on said table, and means for charging said mineral mixtures on said table and for discharging the non-adhering constituents thereof from the table and the adhering ones from said drum.

14. An apparatus for the mechanical separation of coarse-grained mineral mixtures by the difference of their constituents in adhesiveness relative to adhesion masses, comprising in combination an adhesion mass adapted to adhere constituents of said mixtures having at least more than 3 mm. diameter, a rotary conical drum coated with said adhesion mass, a rotary table on which said rotary conical drum rolls, means to exert pressure during rolling of said conical drum on said table, and means for charging said mineral mixtures on said table and for discharging the non-adhering constituents thereof from the table and the adhering ones from said conical drum.

15. An apparatus for the mechanical separation of wetted coarse-grained mineral mixtures by the difference of their constituents in adhesiveness relative to adhesion masses, comprising in combination an adhesion mass of a material selected from the group consisting of hydrophilic and hydrophobic substances adapted to adhere selectively constituents of said mixtures having at least more than 3 mm. diameter in accordance with their wetness, a plurality of rotary drums coated with said adhesion mass, a rotary band of sponge rubber, means to cause said rotary drums to roll on said rotary band, means to exert a pressure of said rotary drums on said band, means for charging said coarse-grained mixtures on said band, and means for discharging the adhering constituents thereof from said adhesion masses on said drums.

16. An apparatus for the mechanical separation of wetted coarse-grained mineral mixtures by the difference of their constituents in adhesiveness relative to adhesion masses, comprising in combination a tacky solid adhesion mass of a material selected from the group consisting of hydrophilic and hydrophobic substances adapted to adhere selectively against the action of gravity constituents of said mixtures having at least more than 3 mm. diameter in accordance with their wetness, a surface coated with said adhesion mass, a second surface on which the said coarse-grained mixtures are placed, and means to exert a pressure when contacting the said surface coated with the adhesion mass with said second surface covered with said mineral mixtures.

17. An apparatus for the mechanical separation of wetted coarse-grained mineral mixtures by the difference of their constituents in adhesiveness relative to adhesion masses, comprising in combination a tacky solid adhesion mass of a material selected from the group consisting of hydrophilic and hydrophobic substances adapted to adhere selectively against the action of gravity constituents of said mixtures having at least more than 3 mm. diameter in accordance with their wetness, a rotary surface coated with said adhesion mass, a second surface on which the said coarse-grained mixtures are placed, means to cause said rotary surface to roll on said second surface, and means to exert a pressure when contacting the said surface coated with the adhesion mass with said second surface covered with said mineral mixtures.

18. An apparatus for the mechanical separation of wetted coarse-grained mineral mixtures by the difference of their constituents in adhesiveness relative to adhesion masses, comprising in combination, a tacky solid adhesion mass of an organic hydrophobic substance adapted to adhere selectively against the action of gravity constituents of said mixtures having at least more than 3 mm. diameter in accordance with their wetness, a rotary surface coated with said adhesion mass, a second surface on which the said coarse-grained mixtures are placed, means to cause said rotary surface to roll on said second surface, and means to exert a pressure when contacting the said surface coated with the adhesion mass with said second surface covered with said mineral mixtures.

19. An apparatus for the mechanical separation of wetted coarse-grained mineral mixtures by the difference of their constituents in adhesiveness relative to adhesion masses, comprising in combination a tacky solid adhesion mass of petroleum bitumen adapted to adhere selectively constituents of said mixtures having at least more than 3 mm. diameter in accordance with their wetness, a rotary surface coated with said adhesion mass, a second surface on which the said coarse-grained mixtures are placed, means to cause said rotary surface to roll on said second surface, and means adapted to exert a pressure when contacting the said surface coated with the adhesion mass with said second surface covered with said mineral mixtures.

20. An apparatus for the mechanical separation of wetted coarse-grained mineral mixtures by the difference of their constituents in adhesiveness relative to adhesion masses, comprising in combination a rotary drum having a tacky solid adhesion mass coated thereon of a material selected from the group consisting of hydrophilic and hydrophobic substances and adapted to adhere grains of said mixtures having at least more than 3 mm. diameter selectively against the action of gravity in accordance with their wetness, a second rotary drum adapted to feed the said mixtures to said first rotary drum and to exert pressure thereon, and means for separately discharging the said constituents of different adhesiveness to said adhesion mass.

21. An apparatus for the mechanical separation of wetted coarse-grained mineral mixtures by the difference of their constituents in adhesiveness relative to adhesion masses, comprising in combination a tacky solid adhesion mass of an organic hydrophobic material adapted to adhere selectively against the action of gravity constituents of said mixtures having at least more than 3 mm. diameter in accordance with their wetness, a surface coated with said adhesion mass, and means to exert a pressure when contacting the said surface coated with the adhesion with said mineral mixtures.

ERNST BIERBRAUER.